June 23, 1959  J. S. GREGORIUS  2,891,777
GLASS STIRRING MECHANISM
Filed March 8, 1955
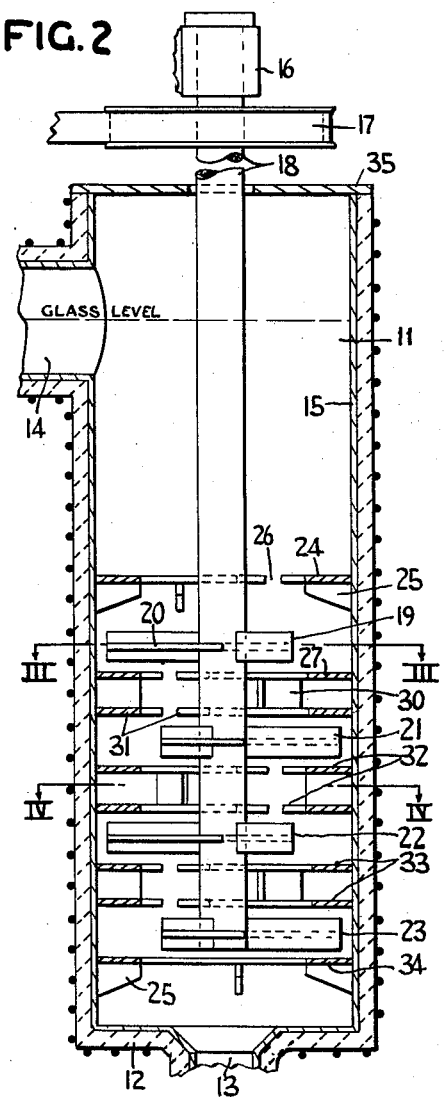
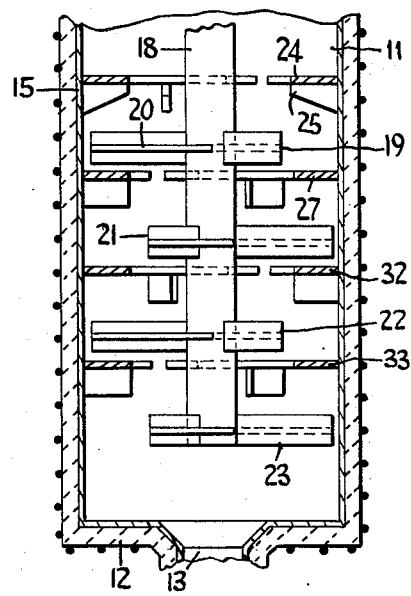
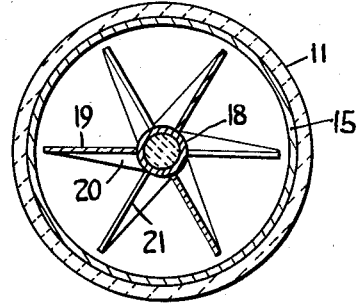
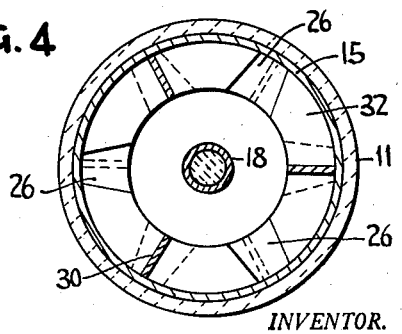
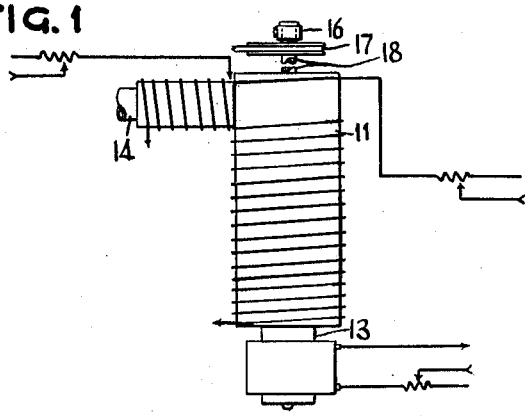
INVENTOR.
JOSEPH S. GREGORIUS
BY
Oscar H. Spencer
ATTORNEY United States Patent Office 2,891,777
Patented June 23, 1959

2,891,777
GLASS STIRRING MECHANISM

Joseph S. Gregorius, Tarentum, Pa., assignor to Pittsburgh Plate Glass Company, Allegheny County, Pa., a corporation of Pennsylvania Application March 8, 1955, Serial No. 492,940

4 Claims. (Cl. 259—107)

This invention relates to glass stirring mechanisms and more specifically to homogenization of glass of optical quality in a continuous process.

In the manufacture of optical and ophthalmic glass by the continuous process, batch ingredients are heated in a melter or tank furnace usually constructed of nonmetallic refractory material. As the batch ingredients melt, they give off gas which is dispersed at first throughout the molten mass in the form of bubbles, referred to in the art as "seed." The molten glass passes through a heated refining zone, usually a platinum vessel vented to the atmosphere. In flowing through the refiner, the bubbles gradually escape.

Immediately after melting, the ingredients are not uniformly distributed in the glass and without further homogenization the glass would be chemically and optically inhomogeneous. Optical examination would disclose inhomogeneity in the form of striae. Because of the high viscosity diffusion alone cannot make these striae disappear in the time available for economic operation. This will be apparent when it is considered that the required degree of homogenization is such that in certain grades of optical glass the refractive index of the final product must be uniform within .00001 unit. To obtain the necessary degree of uniformity, the glass coming from the refiner is homogenized by mechanical stirring which acts to stretch or attenuate the striae. They become thinner and present relatively more surface area in relationship to volume thus hastening diffusion into the surrounding mass.

In an incompressible fluid any deformation must be by way of shear; in order to produce attenuation, shearing forces must be exerted upon the liquid. In thin liquids, turbine-type stirrers produce turbulence which persists in regions remote from the turbine blades. Since all turbulence involves shear effective homogenization takes place over a volume greatly in excess of that traversed by the blades. In molten glass, turbulence will not persist because of the high viscosity of the liquid medium.

In the prior art, homogenization in the continuous optical glass process has been achieved by rotation of a multiplicity of turbine wheels with radial impeller blades operating within smooth-walled vertical cylindrical vessels. The rate of shear is proportional to the rate of change of velocity within the liquid, hence the most effective homogenization (intense shear) in such a device takes place only at the small volume surrounding the blade tips. The space in which intense shear takes place is further limited by the extent of surface of the cylinder.

According to my invention, the limitations of the prior art stirrers are overcome by the introduction of stationary shelves adjacent to the blades whereby the zones of intense shear are extended to include additional parts of the turbine blade edges.

The accomplishment of the invention will best be understood by reference to the accompanying drawings wherein Fig. 1 shows in elevation the mixing container in association with the inlet from the refiner and the work feed or discharge tube togther with heating elements used to control the temperature in the feed, mixing and discharge passages;

Fig. 2 is an enlarged vertical section through the container showing the relationship of the component parts thereof;

Fig. 3 is a cross-section through the impeller on the lines III—III of Fig. 2 illustrating the arrangement of the stirring blades without regard to the shelves;

Fig. 4 is a cross-section through the container taken along lines IV—IV of Fig. 2 illustrating the arrangement of the shelves without regard to the stirrer blades;

Fig. 5 is a view similar to Fig. 2 of an alternate and simplified embodiment of the invention.

Referring to the drawings in detail, a vertically disposed elongated chamber is indicated at 11. Preferably, the exterior walls of the chamber are constructed of refractory ceramic material. The base 12 of the chamber is provided with a discharge opening 13 and near the top of the chamber there is provided an inlet opening 14. The wall, base, inlet and outlet of the chamber 11 are sheathed with an inner lining of platinum 15. Rotatably supported in a bearing 16 and provided with driving means 17 is a cylindrical rod or shaft 18 projecting downwardly and coaxially into the interior of the cylindrical chamber 11. Attached to the shaft and extending radially therefrom to a location in proximity to the wall of the chamber 11 are a plurality of sets of blades, the uppermost set being indicated by the reference character 19 and consisting of three individual blades spaced at 120° intervals about the shaft at a location substantially below the level of the inlet 14. The blades 19 are reinforced by ribs or webs 20 joined to the shaft 18 and lying in planes normal to the planes of the blades. Spaced downwardly along the shaft from the set of blades 19 is a further set of blades 21 of the same construction and uniformly disposed about the shaft at 120° intervals, but each being disposed in a vertical plane 60° from the plane of the corresponding blade of the upper set so as to produce a staggered effect as best illustrated in Fig. 3. Below the set of blades 21, a similar set of blades 22 is attached to the shaft, each blade registering with the blades 18 of the uppermost set. A fourth set of blades 23 at the bottom of the shaft coincide in registry with the planes of blades 21. Thus, there are provided along the shaft four sets of blades, alternate pairs being in registry and consecutive pairs being rotated 60° with respect to each other and the axis of the shaft.

Attached to the wall of the container and projecting inwardly therefrom to a terminus overlapping the tips of blades 19 are a series of arcuate shelves 24 having reinforcing webs or gussets 25. Each shelf 24 is separated from the adjacent shelf by space 26 for purposes hereinafter described. Immediately below the blades 19, there is arranged a series of arcuate shelves 27 of similar dimensions and configuration to the shelves 24 but disposed so that the space 26 between the individual shelves is disposed 60° around the cylinder wall from the corresponding shelves 24. Thus, the openings 26 between the shelves 27 are 60° out of registry with the openings between the shelves 24. Joined to the shelves 27 by a supporting web 30 is a corresponding set of shelves 31 in registry with the shelves 27. Spaced between blades 21 and 22 is a further set of double shelves 32 in registry with shelves 24 and between sets of blades 22 and 23 is a further set of double shelves 33 in registry with shelves 27 and 31.

Below the lowermost set of blades 23 lies a shelf 34 comprising a continuous annulus, the innermost extremity of which overlaps the tips of the lowermost set of blades and which has a central opening in registry with the discharge orifice 13. The staggered relationship of the openings thus provided between the alternate series of shelves is best illustrated in Fig. 4.

It will be noted that the arrangement of the shelves is such as to greatly increase the edge area of each blade which is in close proximity to a stationary element, thus increasing the zones of intense shear well inward of the blade tips.

The cylindrical mixing chamber is provided with a removable closure 35 having a central opening to accommodate drive shaft 18.

The apparatus is so constructed that the drive shaft and associated mixing blades may be inserted or removed from the container without disturbing the shelves. In inserting the shaft 18, the set of blades 23 is brought into registry with the openings 26 between shelves 24 and the shaft is lowered until blades 23 lie between shelves 24 and shelves 27 at which time the shaft is rotated 60° and lowered one more stage bringing the blades 22 between shelves 24 and shelves 27. This operation is twice more repeated until the blades 19 lie between shelves 24 and 27 at which time the shaft is in full complementary position with respect to the adjacent shelves.

In operation, the chamber 11 is permitted to fill with molten refined glass through the inlet 14, after which the stirring shaft is rotated by the driving means to homogenize the glass therein. Thereafter, the glass is permitted to discharge through the outlet 13 continuously while the shaft is rotated at a speed such as to provide adequate homogenization of the contents.

Striae-containing glass enters the mixing chamber through the inlet orifice and flows downwardly through the chamber, those increments of glass following the walls of the cylinder being forced inwardly by shelves 24 under the influence of gravity. In the space between the shelves 24 and 27, the glass is subjected to intense shearing action by the movement of the blades 19. Additional shearing action takes place at the gussets 25 and at the surfaces of the wall and the shelves. Any increment of glass passing through the space between shelves 24 and 27 is again forced away from the walls toward the shaft in passing to the next set of blades 21 wherein the intense shearing action is repeated.

The complementary action of the shelves with the rotating elements insures repeated and intense shearing of each unit volume, as it progresses through the mixing chamber, and thus insures adequate homogenization. Striate free glass is discharged through the outlet or orifice 13.

An alternative and simplified embodiment of the invention is illustrated in Fig. 5 wherein the reference numbers indicate corresponding parts. In this embodiment, the arrangement is similar to that shown in Fig. 2 with the exception that the shelves intermediate the different sets of blades are single shelves rather than pairs. The shelves are disposed in the same manner around the wall to provide offset openings whereby the glass is prevented from proceeding downwardly in an uninterrupted path.

Various modifications may be made in the apparatus disclosed without departing from the spirit of the invention as typified in the claims. For instance, the shelves may be inclined at an angle to the horizontal and spaced differently than shown provided that they overlap the tips of the blades and are in proximity thereto sufficient to appreciably augment the shearing forces obtained between the blade tips and the vertical walls. The form of the impeller blades may be arcuate rather than plane, and the number of shearing stations as defined by the complementary blades and shelves may be augmented or diminished.

I claim:

1. Glass stirring apparatus comprising a vertically disposed elongated chamber having a cylindrical wall, an inlet adjacent the top thereof, an outlet at the lower end, a drive shaft rotatably supported above said inlet and projecting axially and downwardly into said chamber, first and second vertically displaced sets of blades attached to said shaft and extending radially therefrom to tips in proximity to said wall, said blades in the first set being offset angularly relative to the blades in the second set and said blades in each set being arranged at predetermined intervals about said shaft, first and second vertically displaced sets of circumferentially spaced arcuate shelves extending inwardly from the cylinder wall to a terminus overlapping the blades, the spaces between the shelves in each set conforming in number and disposition to said blades and the spaces between the shelves in said first set of shelves being offset angularly relative to the spaces between the shelves in the second set of shelves, said first set of shelves being above said sets of blades and said second set of shelves being between said sets of blades to permit simultaneous passage of said blades between said shelves during assembly.

2. Apparatus according to claim 1 wherein fixed webs are provided projecting inwardly from the cylinder wall in planes normal thereto and in proximity to the paths of revolution of the blades.

3. Apparatus according to claim 1, wherein the blades of each of said vertically displaced sets of blades are offset equally angularly relative to the blades of each vertically adjacent set and the spaces between the shelves of each vertically adjacent set of shelves are offset angularly an amount corresponding to the angular offset between vertically adjacent sets of blades, each set of blades being displaced from each adjacent set along said drive shaft a distance substantially equal to the displacement between adjacent sets of shelves.

4. Apparatus according to claim 1 including at least one further shelf vertically displaced in the cylinder with respect to the first and second sets of shelves and overlapping the vertical projection of said spaces therebetween.

References Cited in the file of this patent

UNITED STATES PATENTS

| 893,385 | Schlickeysen | July 14, 1908 |
| 2,520,424 | Mills et al. | Aug. 29, 1950 |
| 2,746,729 | Lakins | May 22, 1956 |